United States Patent [19]
Belk

[11] 3,751,740
[45] Aug. 14, 1973

[54] REVERSIBLE RECLINER
[76] Inventor: Earl H. Belk, 2438 San Francisco Ave., Long Beach, Calif. 90806
[22] Filed: Sept. 10, 1971
[21] Appl. No.: 179,366

[52] U.S. Cl.............................. 5/37, 5/47, 297/92, 297/365
[51] Int. Cl............................................. B60n 1/02
[58] Field of Search...................... 297/94, 92, 456, 297/365; 5/37, 47, 48

[56] References Cited
UNITED STATES PATENTS

| 2,429,260 | 10/1947 | Coopersmith | 5/47 |
| 1,677,434 | 7/1928 | Dorton | 297/456 X |
| 2,769,987 | 11/1956 | Thal | 5/37 R |
| 2,625,693 | 1/1953 | Raginsky | 5/47 X |
| 3,247,527 | 4/1966 | Mizelle | 5/48 X |
| 1,044,280 | 11/1912 | Sontheimer | 5/47 |
| 998,890 | 7/1911 | Fuchs | 5/47 |
| 2,539,812 | 1/1951 | Carrick | 5/47 X |

Primary Examiner—Francis K. Zugel
Attorney—Fulwider, Patton, Rieber, Lee & Utecht

[57] ABSTRACT

A reversible recliner particularly adapted for use in recreational vehicles. The recliner includes a pair of seat portions whose positions are reversible so that when one is a seat back facing in one direction the other becomes the seat bottom. In their reversed positions, the seat back becomes the seat bottom and the first seat bottom becomes a seat back facing in an opposite direction. Both seat portions may be arranged horizontally to form a bed. Locking means enable the seat portions to be locked positively in various pivoted positions, preventing movement of the seat portions during a vehicle accident or the like.

6 Claims, 10 Drawing Figures

PATENTED AUG 14 1973
3,751,740
SHEET 1 OF 2
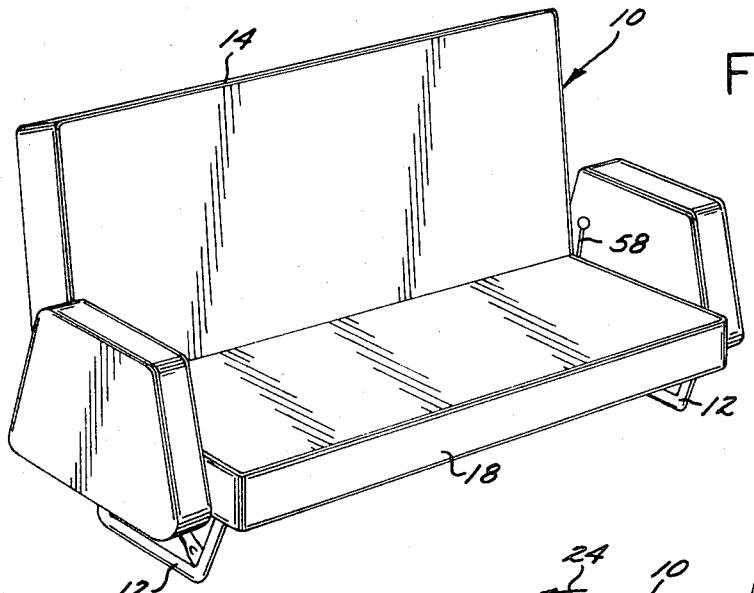
FIG.1
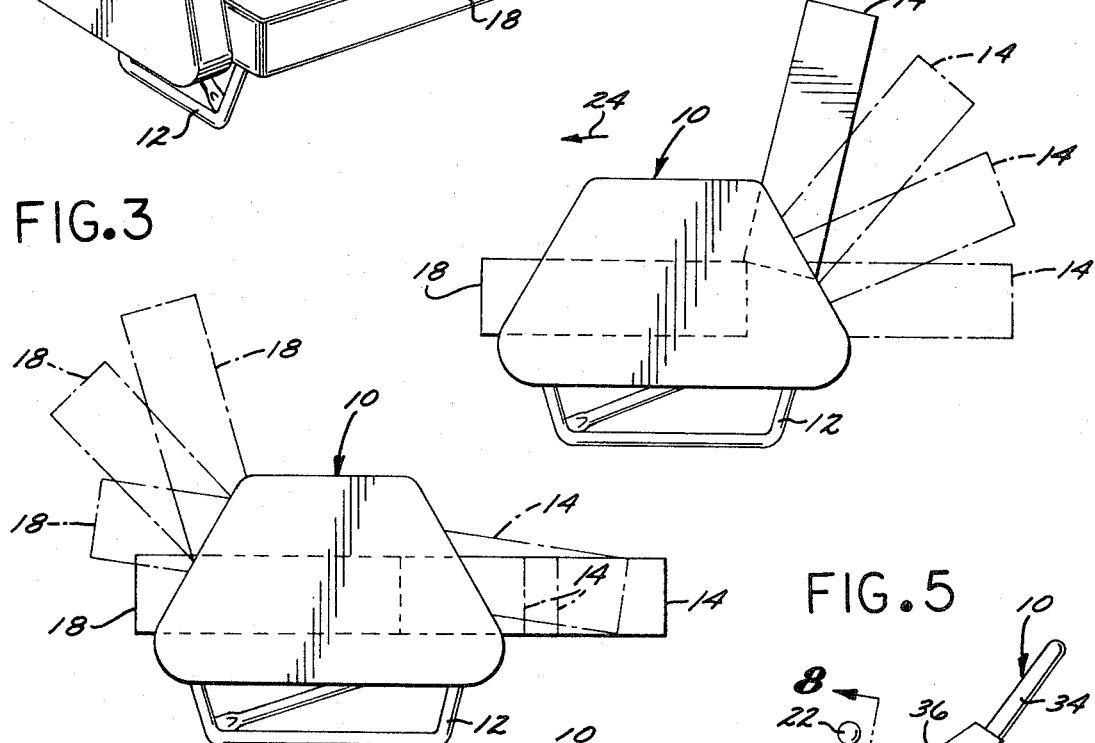
FIG.2
FIG.3
FIG.4
FIG.5
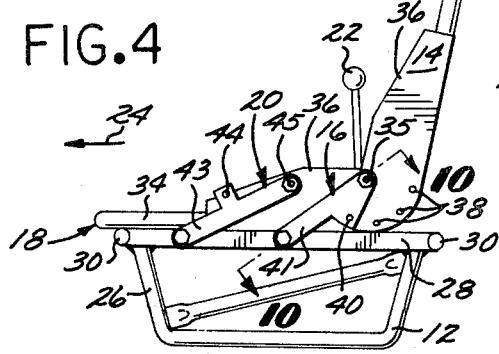
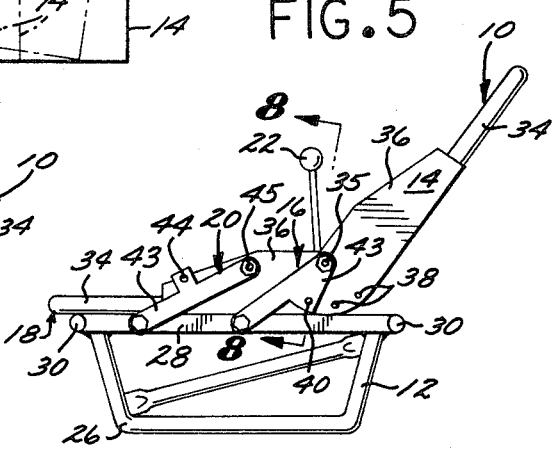
INVENTOR.
EARL H. BELK
BY Fulwider, Patton, Rieber, Lee and Utecht
ATTORNEYS

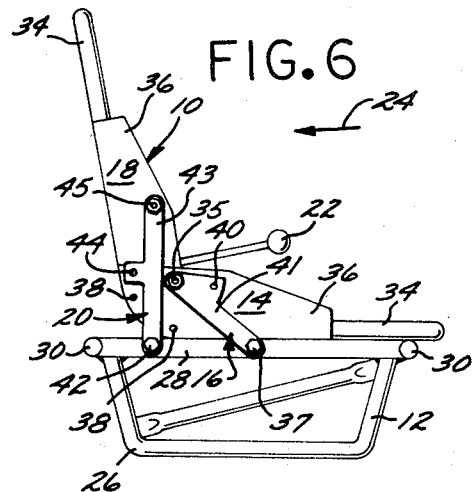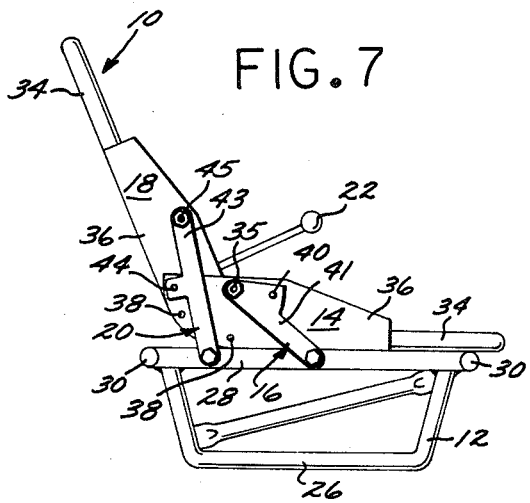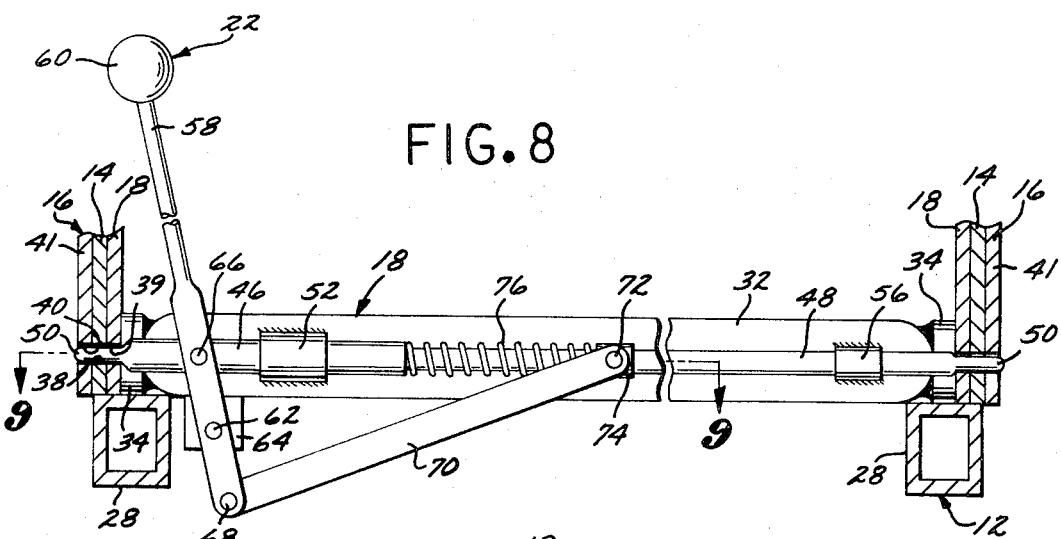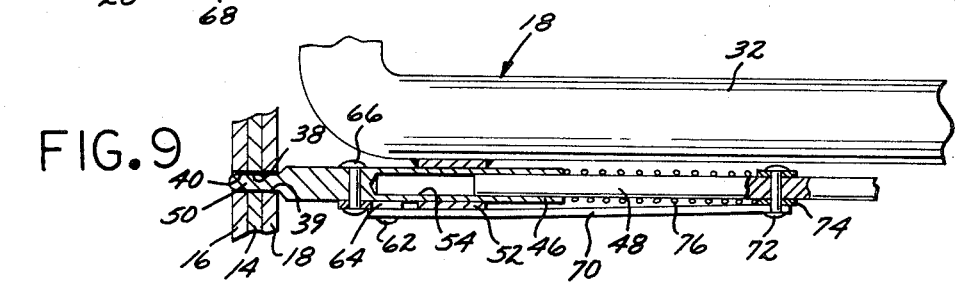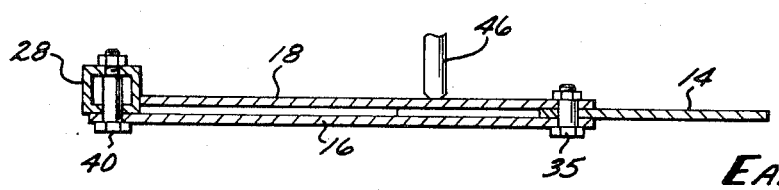

REVERSIBLE RECLINER

BACKGROUND OF THE INVENTION

1. Field of the Invention

The present invention relates to reversible seats and more particularly to reversible seats for use in vehicles.

2. Description of the Prior Art

The reversible recliners or "flip" seats of the prior art can be operated to provide seating in which the passengers face forwardly, and can also be operated into a different position to provide seating in which the passengers face rearwardly. However, these seats generally do not include any positive locking arrangement. Instead, some form of detent or other slight constraint against movement is employed which is easily overcome during an impact of the vehicle in an accident. Consequently, the seat back can slam forwardly and injure the passengers, and the seat bottom can carry away and be thrown about the passenger compartment. Lack of adequate locking mechanisms thus exposes the passengers to considerable danger during any vehicle collision.

Safety regulations of various government agencies now require that the seat components of reversible seats, such as those which are used in recreational vehicles, be capable of being locked in any of their pivoted positions. A lightweight, inexpensive, easily operable, and relatively maintenance-free locking arrangement is thus needed to satisfy current safety regulations in this field.

SUMMARY

According to the present invention, a reversible recliner is provided which includes pivotable seat portions or components adapted to be locked in any of a variety of pivoted positions. The locking means is easily operated by one person and is effective to lock the seat components together quickly and easily without affecting the capability of the recliner to be reversed to seat forward facing passengers in one position and rearward facing passengers in another position.

The present seat components include reversible seat portions which alternately serve as seat bottom and seat back. Each seat portion is carried by a seat frame by pivot means for movement from a seat back orientation, in which the locking means is adapted to lock it in any of its pivoted positions, to a seat bottom position. In this seat bottom position the locking means then cooperates with the other seat portion to lock it in any of its pivoted, seat back positions. In effect, the movement which reverses the seat back-seat bottom functions of the seat portions also reorients the components so that the locking means is moved from recline adjustment association with one seat portion to recline adjustment association with the other seat portion. In addition, the locking means is preferably effective to lock the two seat portions to one another regardless of the seat portion with which the locking means is then in recline adjustment association.

The present reversible recliner is relatively inexpensive to fabricate, easy to maintain, and quickly and simply operated to adjust the pivoted position of the seat back and to reverse the direction of passenger seating.

Other objects and features of the invention will become apparent from consideration of the following description taken in connection with the accompanying drawings.

BRIEF DESCRIPTION OF THE DRAWINGS

FIG. 1 is a perspective view of a reversible recliner according to the present invention;

FIG. 2 is a side elevational view of the recliner of FIG. 1, illustrating in phantom outline various forward facing positions of the seat portions;

FIG. 3 is a side elevational view of the recliner of FIG. 1, illustrating in phantom outline various rearward facing positions of the seat portions;

FIG. 4 is a side elevational view similar to FIG. 2, with the upholstery removed for clarity;

FIG. 5 is a view similar to FIG. 4, illustrating the seat back in a more rearwardly tilted position;

FIG. 6 is a view similar to FIG. 4, illustrating the seat portions reversed in orientation so that the seat back faces in a rearward direction;

FIG. 7 is a view similar to FIG. 6, illustrating the seat back in a more rearwardly tilted position;

FIG. 8 is an enlarged view taken along the line 8—8 of FIG. 5;

FIG. 9 is a view taken along the line 9—9 of FIG. 8; and

FIG. 10 is a view taken along the line 10—10 of FIG. 4.

DESCRIPTION OF THE PREFERRED EMBODIMENT

Referring now to the drawings, there is illustrated a reversible recliner 10 according to the present invention and comprising, generally, a frame 12; a first seat portion 14; a first pivot means 16 connecting the seat portion 14 to the frame 12; a second seat portion 18; a second pivot means 20 connecting the seat portion 18 to the frame 12; and a seat lock mechanism 22.

As will be seen, the recliner 10 can be operated so that seat portion 18 serves as a seat bottom and seat portion 14 serves as a pivotable seat back for passengers facing in a forward direction, as indicated by the numeral 24 in FIG. 2, the seat portion 14 being pivotable from the full line position, through the intermediate positions indicated in phantom outline position, to a generally horizontal bed position.

Both seat portions 14 and 18 can be arranged in horizontal bed positions, as seen in FIG. 3. From this position, as will be described, the seat portions can be swung upwardly and forwardly to a bed position forwardly of that illustrated in FIG. 3. In this forwardly translated position the seat portion 18 can be pivoted upwardly to form the seat back, as will be apparent.

The frame 12, as best seen in FIGS. 4–10, may take any configuration suitable for support of the seat portions. Preferably its components are made of lightweight structural tubing and metal plate. The frame includes a pair of side structures 26 formed of round tubing, that is, of circular cross section. The lower portion of each side structure 26 extends horizontally for easy attachment to the floor or other supporting surface (not shown) by any suitable means. From the opposite extremities of this horizontal portion a pair of legs extend upwardly and are welded or otherwise secured to the adjacent ends of a pair of horizontal, longitudinally extending tubular members or frame side elements 28. The elements 28 are part of a rectangular structure which also include a pair of horizontal, transversely extending transverse tubular members or frame elements 30 which are welded to the ends of the elements 28.

Each seat portion 14 and 18 is formed of round tubing rigidly connected in a generally rectangular configuration, including parallel inner and outer horizontal support elements, the inner support element 32 being seen in FIG. 8. Each seat portion also includes a pair of parallel side elements 34 welded to the ends of the horizontal support elements.

Each seat portion includes a pair of elongated locking or support plates 36 made of sheet metal or plate and bolted, welded, or otherwise rigidly secured to its side elements 34. As seen in FIG. 6, the inner extremity of each support plate 36 extends inwardly beyond the transverse element 32 which froms the lower extremity of the seat portion frame. The plate inward extremity of seat portion 14 includes a series of arcuately extending lock openings 38, while seat portion 18 includes a single lock opening 39. As will be seen, seat portions 14 and 18 are preferably locked together in their pivoted positions by certain elements which pass through the lock openings 38 and 39.

Seat portions 14 and 18 are pivotally mounted to the frame 12 by the pivot means 16 and 20, respectively. With reference to FIG. 6, pivot means 16 comprises a pair of elongated links or arms 41 located on opposite sides of the recliner 10 and pivotally secured at their lower ends to approximately the mid portions of the side elements 28 by any suitable means, such as by fasteners 37. The upper ends of the arms 41 are similarly pivotally connected to the support plates 36 by fasteners 35. In addition, each arm 41 includes an edge projection or side tab having a lock opening 40.

The second pivot means 20 is similar to the pivot means 16 and comprises a pair of elongated links or arms 43 whose upper ends are pivotally secured by suitable fasteners 45 to the support plates 36 of the seat portion 18. The lower ends of the arms 43 are pivotally secured by suitable fasteners 42 to the frame side elements 28 at points located forwardly relative to the pivotal attachments of the arms 41 and frame 12. Each of the arms 43 includes an edge projection or side tab having a lock opening 44.

The seat lock mechanism 22 which is operative to lock the seat portions 14 and 18 together is secured to the seat portion 18, although it could just as well have been secured to the other seat portion, as will become apparent. Referring now to FIGS. 8-10, the seat lock mechanism 22 comprises a pair of elongated, transversely oriented rods 46 and 48 which are located behind or inwardly of the lower support element 32 of the seat portion 18. The outer ends of the rods 46 and 48 are each of reduced diameter to form locking pins 50 adapted to slideably enter the various lock openings of the recliner components.

The rod 46 is supported on the element 32 by a sleeve 52 welded to the element 32 and slidably accommodating the rod 46. The end of the rod 46 opposite its pin 50 includes a blind bore 54, FIG. 9, within which the adjacent extremity of the rod 48 is slideably carried. The opposite extremity of the rod 48 is slideably carried within a sleeve 56 which is welded to the support element 32.

Transverse movement of the rod 46 is accomplished by an elongated operating rod or handle 58 which extends outwardly of the support element 32, the upper end of the handle 58 including an operating knob 60 to facilitate movement. As seen in FIGS. 1-3, the handle 58 projects outwardly of the crevice or juncture between the pair of seat portions 14 and 18.

The handle 58 is pivotally secured by a pin 62 to a mounting tab 64 welded to the seat portion support element 32. Above the pivot pin 62 the handle 58 is pivotally secured to the rod 46 by a pin 66, while below the pin 62 the handle 58 is pivotally secured by a pin 68 to the outer end of an elongated transfer arm 70. The opposite or inner end of the transfer arm 70 is pivotally secured to a sleeve 74 by a pin 72 which secures both to the rod 48.

A compression spring 76 is disposed about the rod 48 and its opposite extremities bear against the sleeve 74 and the inner end of the rod 46. The spring 76 normally biases the rods 46 and 48 away from each other so that the pins 50 are projected outwardly for engagement with the various lock openings of the seat components. More particularly, when handle 58 is urged inwardly by a passenger, the lower end of the handle 58 pivots outwardly, moving the sleeve 74 and the rod 48 inwardly and compressing the spring 76. Simultaneously, the handle 58 above the pivot pin 62 moved inwardly, carrying the rod 46 with it and also compressing the spring 76. This moves the locking pins 50 out of engagement with the lock openings.

Upon release of handle 58, the spring 76 biases the pins 50 outwardly for re-engagement with those lock openings in proper registry, as will be seen.

With reference to FIGS. 4-7, the seat portion 18 is oriented to serve as the seat bottom, while the seat portion 14 is oriented to serve as the seat back. In this position the pins 50 of the seat lock mechanism 22 are disposed through the lock openings 38, 39, and 40 of the seat portion 14, seat portion 18, and arms 41.

The seat lock mechanism can be operated, as previously described, to move the pins 50 out of the lock openings to permit the seat portion 14 to be reclined or more rearwardly pivoted, as seen in FIG. 5. Release of the seat lock mechanism 22 then allows the bias of the spring 76 to project the pins 50 into the newly aligned or registered lock openings of the seat portions 14, 18, and the arms 41.

It is noted that the lock openings 38 and 40 are arranged at equal radial distances from the transverse axis of the lock pins 50 so that registry therebetween can be accomplished in any pivoted position of the seat portion 14. However, at this time lock openings 44 of arms 43 are out of registry with the axis of pins 50.

Both seat portions 14 and 18 can be pivoted to horizontal or to bed positions, as seen in FIG. 3. If it is desired to reverse the position of the recliner 10 so that passengers can be seated facing rearwardly, the seat portions 14 and 18 are translated or pivoted forwardly as an integral unit, pivoting upon the arms 41 and 43 in the manner of a parallelogram linkage, without pivotal movement of the seat portions relative to one another.

The former seat bottom portion 18 can now be pivoted upwardly to serve as a seat back facing in a rearward direction, as best seen in FIGS. 6 and 7. At this time the pins 50 are no longer in registry with the lock openings 40 of the arms 41, but are in registry with the lock openings 44 of the arms 43. The pins 50 pass through these openings as well as the lock openings of the seat portions 14 and 18 to lock the components against movement.

Movement of seat portion 18 to the recline position of FIG. 7 is accomplished by disengaging the pins 50, pivoting the seat portion 18 backwardly to the desired position, and then re-engaging the pins 50, it being noted that lock openings 38 and 44 are located equal distances from the transverse axis of the pins 50 for proper registry with the pins 50.

In summary, the present recliner 10 is adapted to seat passengers in either forward facing or rearward facing directions, and is further adapted to serve as a bed. The seat portions can be locked in any of their adjusted positions, eliminating any danger of injury to the passengers in a vehicle collision or the like.

Various modifications and changes may be made with regard to the foregoing detailed description without departing from the spirit of the invention.

I claim:

1. A reversible recliner comprising:
   a frame;
   a transversely extending first seat portion;
   a pair of first means pivotally connected to opposite sides of said first seat portion whereby said first seat portion is pivotable between a seat back position and a seat bottom position;
   a transversely extending second seat portion located adjacent said first seat portion;
   a pair of second means pivotally connected to opposite sides of said second seat portion whereby said second seat portion is pivotable between a seat back position and a seat bottom position, said first and second means being movable on said frame between forward and reverse locations; and
   seat lock means operable to lock said first seat portion to both said pair of first means in a selected one of said positions of said first seat portion, when said first and second means are in said forward location, said seat lock means also being operable to lock said second seat portion to both said pair of second means in a selected one of said positions of said second seat portion when said first and second means are in said reverse location.

2. A reversible recliner according to claim 1 wherein said seat lock means is operative in both said forward and reverse locations to lock together said first and second seat portions.

3. A reversible recliner according to claim 1 wherein said first and second means each comprise a pair of elongated arms on opposite sides of said seat portions and pivotally connected at their upper extremities to said seat portions, and wherein the lower extremities of said arms are pivotally connected to said frame for movement of said arms between said forward and reverse locations.

4. A reversible recliner according to claim 1 wherein each said first and second seat portions includes side plates cooperative with said seat lock means to lock each said first and second seat portions in said selected positions.

5. A reversible recliner seat-bed comprising:
   a frame;
   a pair of first pivot means connected to opposite sides of said frame for pivotal movement about a first frame axis;
   a transversely extending first seat portion connected at opposite sides to said pair of first pivot means for pivotal movement between a seat back position and a seat bottom position, said pivotal movement occurring about a first recline axis;
   a pair of second pivot means connected to opposite sides of said frame for pivotal movement about a second frame axis;
   a transversely extending second seat portion connected at opposite sides to said pair of second pivot means for pivotal movement between a seat back position and a seat bottom position, said pivotal movement occurring about a second recline axis; and
   seat lock means selectively operable to lock said first seat portion to said second seat portion and to both said first pivot means in a selected one of said positions of said first seat portion to prevent pivotal movement of said first seat portion about said first recline axis and about said first frame axis, said seat lock means also being selectively operable to lock said second seat portion to said first seat portion and to both said second pivot means in a selected one of said positions of said second seat portion to prevent pivotal movement of said second seat portion about said second recline axis and about said second frame axis.

6. A reversible recliner comprising:
   a frame;
   a first seat portion;
   a pair of first pivot arms connected at opposite extremities to said frame and to said first seat portion whereby said first seat portion is pivotable upon said first pivot arms between seat back and seat bottom positions and is further pivotable with said first pivot arms upon said frame for movement between forward and reverse locations;
   a second seat portion located adjacent said first seat portion;
   a pair of second pivot arms connected at opposite extremities to said frame and to said second seat portion whereby said second seat portion is pivotable upon said second pivot arms between seat back and seat bottom positions and is further pivotable with said second pivot arms upon said frame for movement between forward and reverse locations; and
   seat lock means carried by one of said seat portions and operable in said forward location of said first and second seat portions to lock said first seat portion to said second seat portion and to both said first pivot arms, said seat lock means also being operable in said reverse location of said first and second seat portions to lock said second seat portion to said first seat portion and to both said second pivot arms.

\* \* \* \* \*